(12) United States Patent
Robertson et al.

(10) Patent No.: US 7,734,635 B2
(45) Date of Patent: Jun. 8, 2010

(54) INDEXED VIEWS

(75) Inventors: George G Robertson, Seattle, WA (US); Mary P Czerwinski, Woodinville, WA (US); Daniel C Robbins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 433 days.

(21) Appl. No.: 11/172,585

(22) Filed: Jun. 30, 2005

(65) Prior Publication Data

US 2007/0005557 A1 Jan. 4, 2007

(51) Int. Cl.
*G06F 7/00* (2006.01)
(52) U.S. Cl. .................. 707/753; 707/736; 707/741; 707/715; 707/752
(58) Field of Classification Search .................. None
See application file for complete search history.

(56) References Cited

U.S. PATENT DOCUMENTS

| | | | | |
|---|---|---|---|---|
| 5,278,980 | A * | 1/1994 | Pedersen et al. | 707/4 |
| 5,915,251 | A * | 6/1999 | Burrows et al. | 707/102 |
| 6,026,409 | A * | 2/2000 | Blumenthal | 707/104.1 |
| 6,262,727 | B1 * | 7/2001 | Lentz et al. | 715/866 |
| 6,625,311 | B1 * | 9/2003 | Zhu | 382/173 |
| 2002/0059210 | A1 * | 5/2002 | Makus et al. | 707/3 |
| 2002/0184480 | A1 * | 12/2002 | Sazegari | 712/300 |
| 2003/0035011 | A1 * | 2/2003 | Lee et al. | 345/780 |
| 2006/0033738 | A1 * | 2/2006 | Wilkinson | 345/440 |
| 2006/0117267 | A1 * | 6/2006 | Koralski et al. | 715/767 |
| 2006/0200794 | A1 * | 9/2006 | Robertson et al. | 717/103 |
| 2006/0253441 | A1 * | 11/2006 | Nelson | 707/7 |

OTHER PUBLICATIONS

Masui, T., et al. "Multiple-View Approach for Smooth Information Retrieval," *UIST '95*, Pittsburgh, Pennsylvania, Nov. 14-17, 1995, pp. 199-206.

* cited by examiner

*Primary Examiner*—John R. Cottingham
*Assistant Examiner*—Hexing Liu
(74) *Attorney, Agent, or Firm*—Lee & Hayes, PLLC

(57) ABSTRACT

A method and interface for managing indices of ordered elements are provided. A subset of elements are selected from an index of ordered elements and displayed on a user interface device. A user can manipulate the display of different subsets of the ordered elements via a user input device. Additional indicia corresponding to the subset of index elements are also displayed on the interface. The additional indicia can include a reference to a visual indicator of index display depth and/or a reference to the location of the displayed elements within the index.

20 Claims, 8 Drawing Sheets

INDEXED VIEWS

BACKGROUND

Generally described, indices can be used to provide quick reference to a larger body of information. For example, an index of subject matter keywords within a book may be created to refer a reader to the location of particular subject matter within the book. In another example, an index of song titles or artists keywords can be used to refer someone to various available media. As applied to computing devices and communication networks, computer-based indices can be utilized in similar manner in which each element in an index displays information to the user. In a more complex embodiment, computer-based indices can also be utilized to provide users with additional information/functionality corresponding to the keyword element. With reference to the previous examples, a computer-based book index may provide display information identifying particular pages in a physical book in which subject matter can be found. In a more complex embodiment, the computer-based book index can allow a user to electronically access the particular portion of the book referenced by an index element. Similarly, a computer-based index of song titles/artists may display information regarding available titles/artists in a media library. In a more complex embodiment, the computer-based index of song titles/artists may allow a user to access the media referenced by each index element.

In the simplest embodiment, index elements can be ordered alphabetically by the first term of each keyword element in the index. This is generally referred to as "straight index." Straight indices can be useful for indices in which the user will know the first term of the desired keyword index element. For example, straight indices can be useful for book indices, such as textbook indices, in which subject matter can be organized by known keywords. However, straight indices can become cumbersome and inefficient for elements that correspond to more than one term or in which the first term of a multiple term keyword is not known. For example, in a straight index of song titles, the keyword element for the song "I'm Going to Kansas City" would only be referenced by the term first term, "I'm." If a user does not necessarily know the first word of a song title (e.g., the user knows that the title includes the term "Kansas City", but doesn't know the full title), the user would have a difficult time identifying the desired index element in a straight index embodiment.

The utilization of permuted indices has addressed some of the deficiencies associated with straight indices. Generally described, permuted indices are ordered indices in which each significant term (e.g., excluding simple terms) in a keyword index element can be searched. With reference to the previous example, in a permuted index, an index element for the song title "I'm Going to Kansas City" could be referenced by the terms "I'm," "Going," "Kansas," and "City." A user could easily locate the keyword index element by searching for the term "Kansas City." Accordingly, permuted indices facilitate index element identification without requiring either full knowledge of the keyword element.

In both straight indices and permuted indices embodiments, as the number of index elements increases, computer-based indices typically cannot show every potential index element that satisfies search criteria. Typically, the computer-based index selects a subset of index elements satisfying the search criteria. For example, the computer-based index may display every Nth element satisfying the search criteria. A user can continue to enter additional search criteria that will likely narrow the number of elements that satisfy the search criteria. If the number of elements satisfying the search criteria is still too large to display, the computer-based index will again display some subset of the elements satisfying the search criteria. The process can continue until the computer-based index can display all possible index elements that satisfy search criteria or a user selects an index element.

As users go through multiple searching iterations, it can become difficult for the user to recognize various properties of the index. In one aspect, a user may not have an idea of the current location of the displayed index elements relative to the entire index. In some embodiments, locating the desired keyword index element can be facilitated with knowledge as to how the displayed elements correspond to all the elements that satisfy the search criteria. Additionally, the user may wish to visualize the relationship of the displayed index elements to each other. In another aspect, a user may not have a reference as to how many successive search iterations have been conducted. In some embodiments, monitoring the number of search iterations and/or navigation between different search levels can further facilitate identifying index elements of interest.

SUMMARY

A method and interface for managing indices of ordered elements are provided. A subset of elements are selected from an index of ordered elements and displayed on an interface. A user can manipulate the display of different subsets of the ordered elements via a user input device. Additional indicia corresponding to the subset of index elements are also displayed on the interface. The additional indicia can include a reference to a visual indicator of index display depth and/or a reference to the location of the displayed elements within the index.

In accordance with an aspect of the present invention, a method for managing an index of ordered elements is provided. The method and accompanying interface can be implemented by a software application. The software application obtains an index having a number of ordered elements, which can be a permuted index. The software application selects a subset of two or more ordered elements corresponding to an index display depth. The subset can be selected based on a selection interval based on a power of two. The software application then displays the subset of the two or more ordered element on a display screen. Additionally, the software application display indicia indicative of at least one index depth property the subset of the two or more elements.

In accordance with another aspect of the present invention, a computer-readable medium having computer executable components for managing an index of ordered elements are provided. The computer-executable components are part of a software application for managing the index of ordered elements. The software application includes an index element selection component for displaying a subset of elements from an index of ordered elements. The subset of elements corresponds to an index display depth. Additionally, the software application includes an index display property selection component for displaying at least one index depth property associated with the subset of elements from the index of ordered elements.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described the present invention relates to method and interface for managing an index of ordered elements. More specifically, the present invention relates to a system and interface for managing the display of various subsets of an ordered index and displaying at least one index depth display property associated with each displayed subset. The present invention may be implemented in a variety of computing devices including, but not limited to, personal computers, hand-held computers, mobile computers, mobile telephones, personal digital assistants, computing terminals, and the like. Additionally, the present invention may be implemented as a stand alone software application or as one or more software components integrated into a software application. Although the present invention will be described with regard to illustrative screen interfaces and examples, one skilled in the relevant art will appreciate that the disclosed embodiments are illustrative in nature and should not be construed as limiting.

Figure 1:
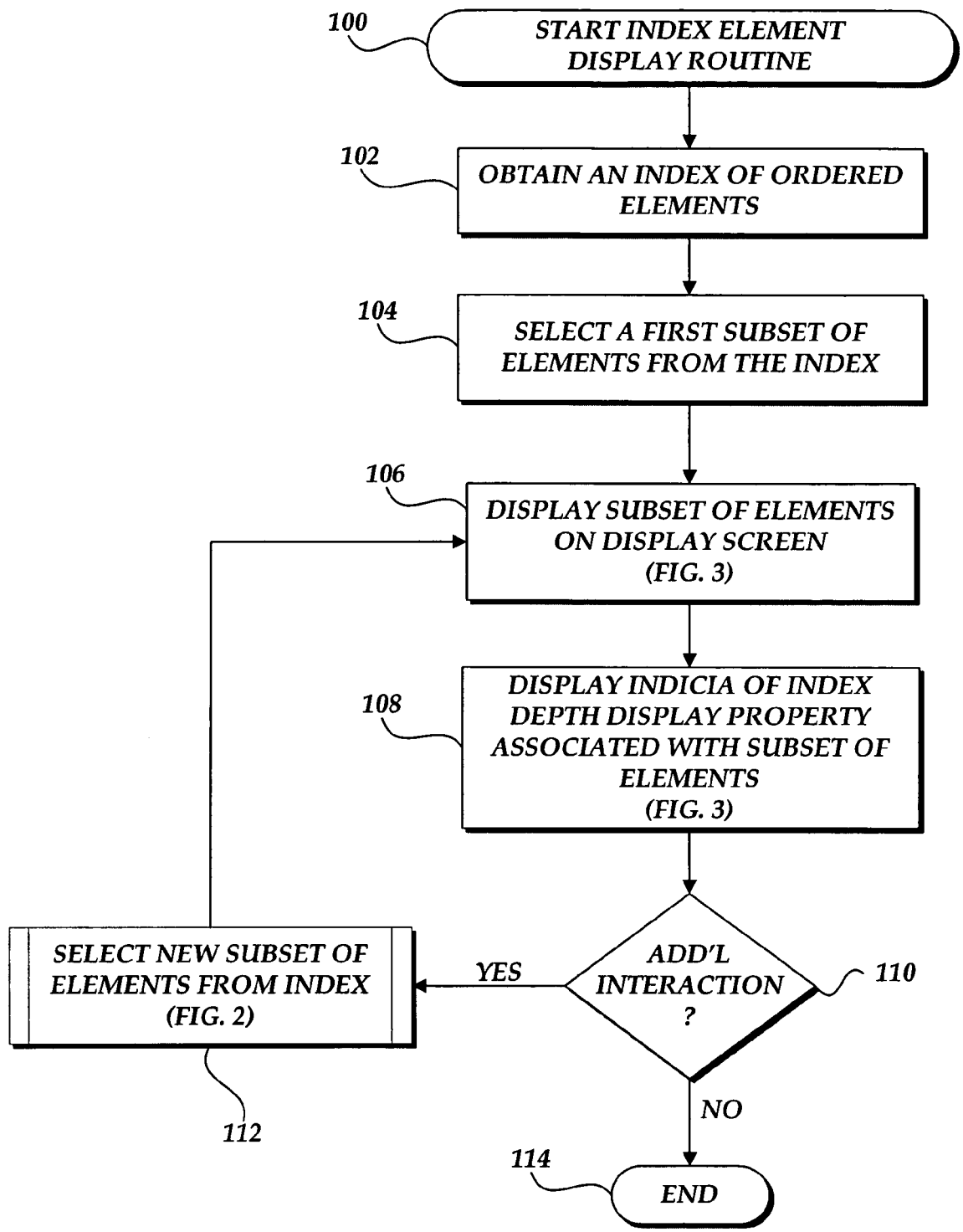
FIG. 1 is a flow diagram of a routine for displaying elements of an ordered index including indicia related to index display depth properties in accordance with an aspect of the present invention.

FIG. 1 is a flow diagram of a routine 100 for displaying elements of an ordered index including indicia related to index display depth properties in accordance with an aspect of the present invention. Routine 100 may be implemented by a software application for managing an index of ordered elements. The software application can include various components for processing the ordered index in accordance with the present invention, such as an index selection component and an index display property selection component. Additionally, one or more functions of the components may be implemented in a distributed manner, such as via a Web service over a communication network.

In an illustrative embodiment, the index of ordered elements can be a straight index arranged alphabetically by the first term describing each element in the index. In another embodiment, the index can be a permuted index arranged by at least a subset of terms in each element of the index. Each index element can include additional text, graphics or images related to the subject matter of the index. Additionally, each index element can include display objects that can be manipulated in a graphical user interface ("GUI"), such as display icons, hyperlinks, and the like, which can initiate or execute additional actions on a computer system. The routine 100 may be initiated by a user as part of a search functionality provided by a software application and/or automatically by a software application during anticipated need by a user (e.g., a mobile telephone dialing procedure). Alternatively, the routine 100 may be initiated by another software application as part of an application protocol interface ("API") provided by the software application. One skilled in the relevant art will appreciate that although the present invention will be described with regard to permuted indices, the present invention is applicable with other types of indices.

With reference to FIG. 1, at block 102, a software application obtains an index of ordered elements. As described above, the index of ordered elements can include straight indices or permuted indices. Additionally, the software application may convert a straight index or a permuted index to another type of index. In an illustrative embodiment, some or a portion of the index may be already be computed. Alternatively, the software application may have to generate an ordered index based upon a referenced target of information. At block 104, the software application selects a subset of elements from the index. In an illustrative embodiment, the software application selects an equal distribution of all the ordered elements in the index to display on the first subset of the index. For example, the software application can select every Nth element in the index, where N is equal to a power of 2. Thus, for a 20,000 element index that can display 20 elements on the display, the software application could choose an interval of 2 to the power 10, or every 1024th element.

At block 106, the software application displays the subset of elements from the ordered list on the display screen. At block 108, the software application displays indicia of index display depth associated with the subset of elements from the ordered list. In an illustrative embodiment of the present invention, the software application can consider an index display depth as the number of sequential selection of subsets of display elements. For example, the initial selection of the subset of display elements would correspond to a first index depth level. A second selection of a subset of display elements, based in part on the first subset of elements selected during the first iteration, would correspond to a second index depth level.

Figure 3:
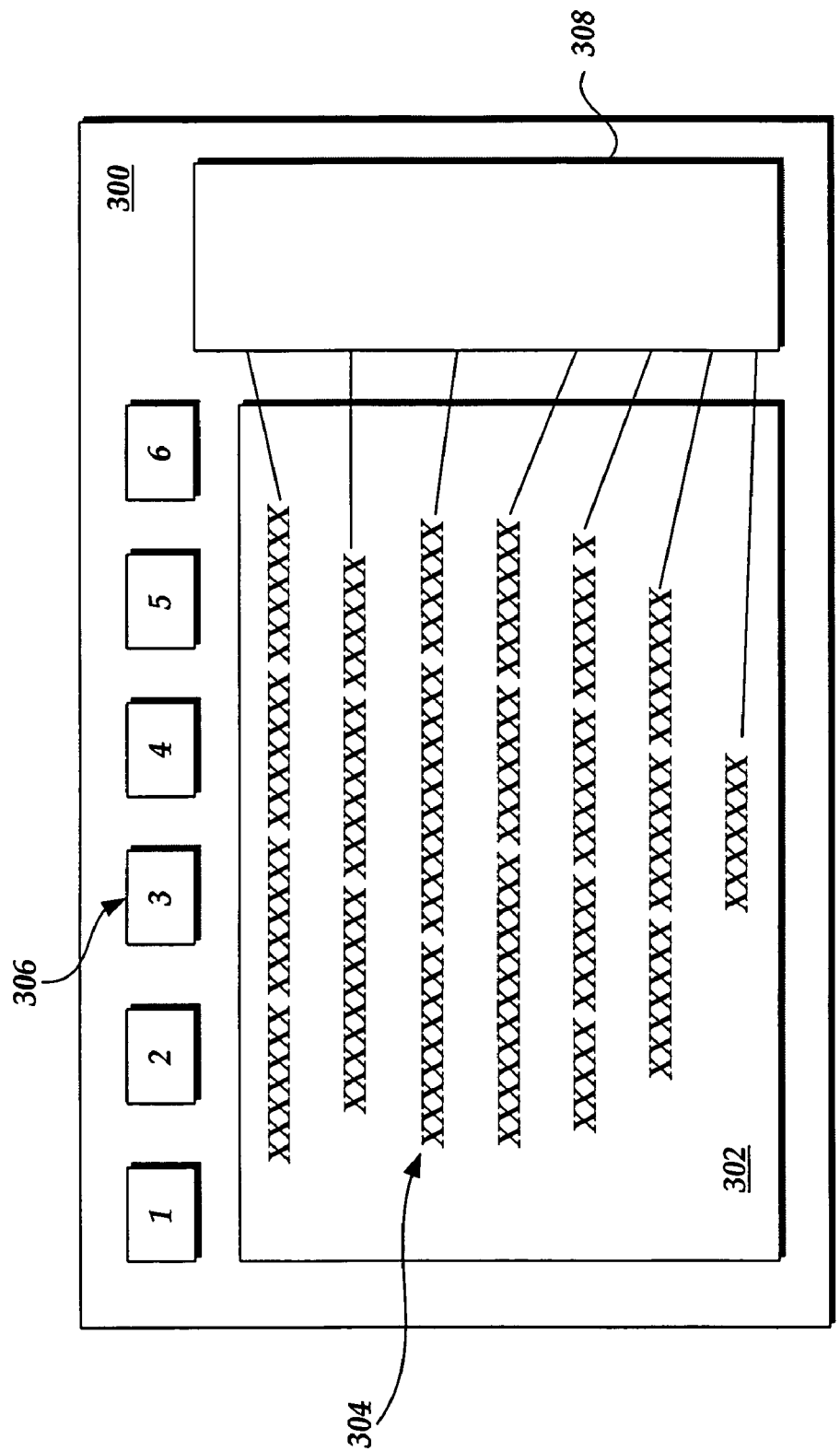
FIG. 3 is a block diagram of a screen display illustrating the presentation of a subset of elements from an ordered index and including indicia related to index display depth properties in accordance with an aspect of the present invention.

FIG. 3 is a block diagram of a screen display 300 illustrating the presentation of a subset of elements from an ordered index and including indicia related to index display depth properties. The screen display 300 a first portion 302 for displaying the subset of index elements 304. The first portion 302 can include various visual cues for identifying relevant terms of keyword index elements, such as highlighting the relevant term on the display screen. The screen display 300 also includes a second portion 306 for displaying indicia of a current index display depth. The indicia of a current index display depth can include various visual cues for identifying the current index display depth. Additionally, the indicia of a current index display depth can correspond to actionable display objects that facilitate movement through various index display depths. In an illustrative embodiment, the number of indicia displayed in the second portion 306 can correspond to the power of the distribution interval selected to display the subset of elements. For example, if the initial distribution of index elements corresponds to 2^7, the second portion 306 would likely have 7 indicia corresponding to 7 potential subsets of display elements.

The screen display 300 also includes a third portion 308 for displaying a representation 308 of at least a portion of the ordered index and the location of the subset of elements 304 displayed in first portion 302. The representation of the index 308 can correspond to an illustration of the overall length of the index in the form of a graphic and/or a thumbnail image. Additionally, the representation can be dynamically adjustable to provide granularity in illustrating keyword element location. Although FIG. 3 illustrates portions 302, 306 and 308 in combination, one skilled in the relevant art will appreciate that additional, or alternative, combinations of portions 302, 306 and 308 may be considered to be within the scope of the present invention.

Returning to FIG. 1, at decision block 110, a test is conducted to determine whether there is additional user interaction. In an illustrative embodiment, if the appropriate index element is displayed to the user on the screen display 300, the user will select the element and the software application can respond by displaying additional information corresponding to the selected element or initiating additional action. If the appropriate index element is not displayed, the user may wish to see additional elements from the index. Accordingly, the user can select an element most related to the desired element (if it has not already been selected). Additionally, the user can indicate a desire to see more or less details related to the selected element. In this regard, more details can relate to a desire to see a closer distribution of elements related to the selected element. Less detail can related to a desire to see a larger distribution of elements related to the selected element. In another example, routine 100 can be initiated by data inputs, such as keyboard inputs on a mobile device. In a further example, routine 100 can also be initiated by graphical commands on a graphical user interface. For example, a user may manipulate a pointing device, such as a mouse, to selectively zoom around a particular index element.

If additional interaction is required, at block 112, the software application selects a new subset of elements from the ordered index. In an illustrative embodiment, the software application can initiate sub-routine 200 to select a new subset of elements from the ordered index. Upon selection of the new subset of elements from the index, routine 100 returns to block 106. If no additional interaction is required, the routine 100 ends at block 114.

Figure 2:
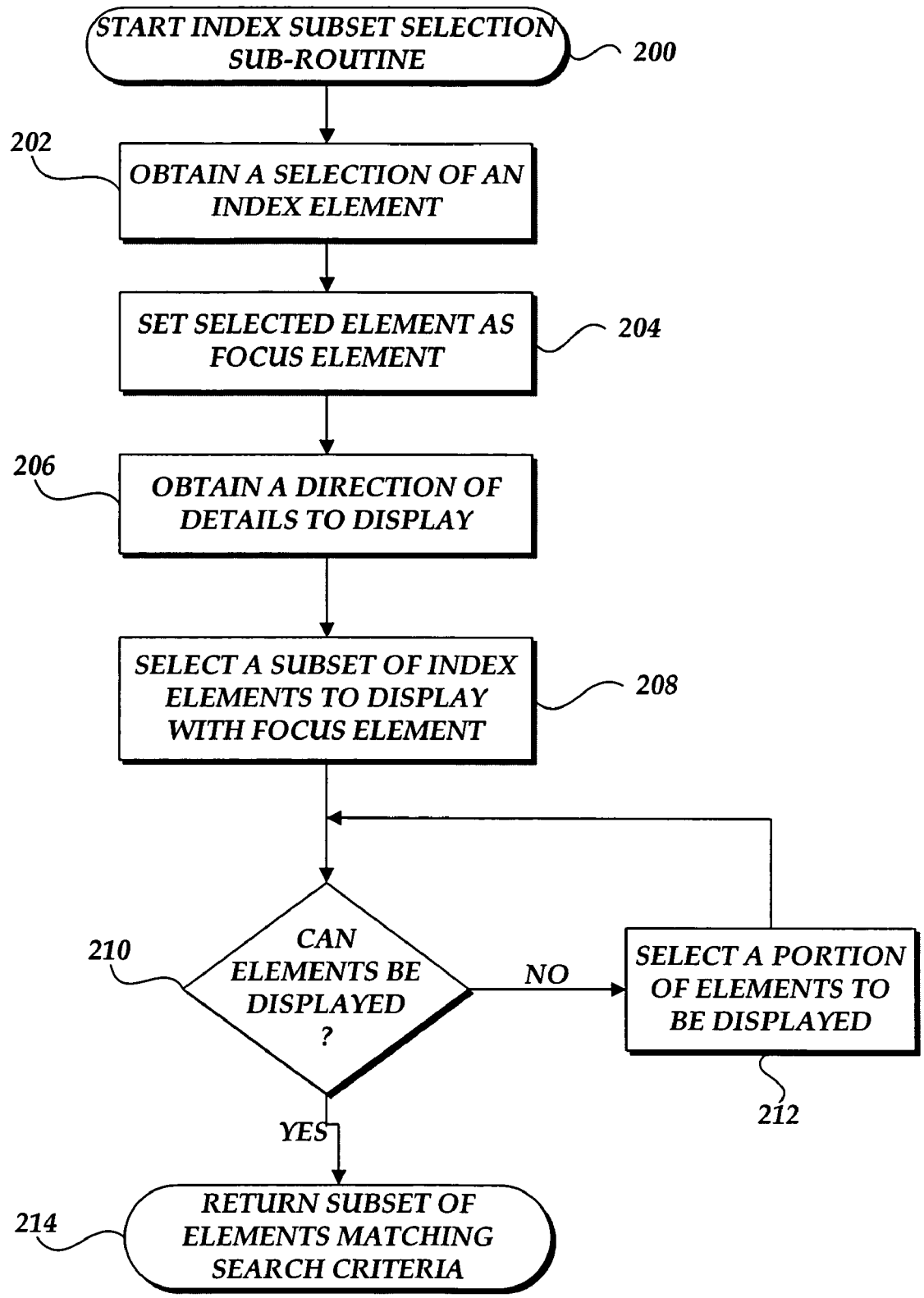
FIG. 2 is a flow diagram of a sub-routine for selecting a subset of elements from an ordered index according to specified search criteria in accordance with an aspect of the present invention.

FIG. 2 is a flow diagram of a sub-routine 200 for selecting a subset of elements from an ordered index and corresponding to block 112 (FIG. 1). At block 202, the software application obtains the selection of an index element. At block 204, the software application sets the selected element as the focus element. In an illustrative embodiment, the setting of the selected element as the focus element will designate the selected element for a subsequent subset of index elements to be displayed. At block 206, the software application obtains a selection of the direction of the user manipulation for more detail or less detail.

At block 208, the software application selects a subset of index elements to be displayed with the focus element. Similar to block 102 (FIG. 1), the software application can select an equal distribution of all the ordered elements in the index to display on the second subset of the index. If the user has indicated a desire to see more detail, the software application will select a smaller distribution for the subset of elements. If the user has indicated a desire to see less detail, the software application will select a larger distribution for the subset of elements. With reference to the previous example, if the current interval corresponds to 2^10, a selection of more detail could entail a distribution interval of 2^9. Similarly, a selection of less details could entail a distribution interval of 2^11.

At decision block 206, a test is conducted to determine whether all the identified elements can be displayed on a display screen. In an illustrative embodiment, the software application can limit the number of index elements that are displayed in the display screen based upon user preferences, available screen size and/or other display criteria. If the number of identified elements in the index satisfying the search criteria exceeds the display threshold, at block 208, the software application selects a portion of the subset of elements to be displayed. In an illustrative embodiment, the software application selects the elements most close to the focus element. Once the selected portion of the index elements is below the threshold, at block 210, the sub-routine 200 returns with the subset of elements based upon the search criteria.

Figure 4A:
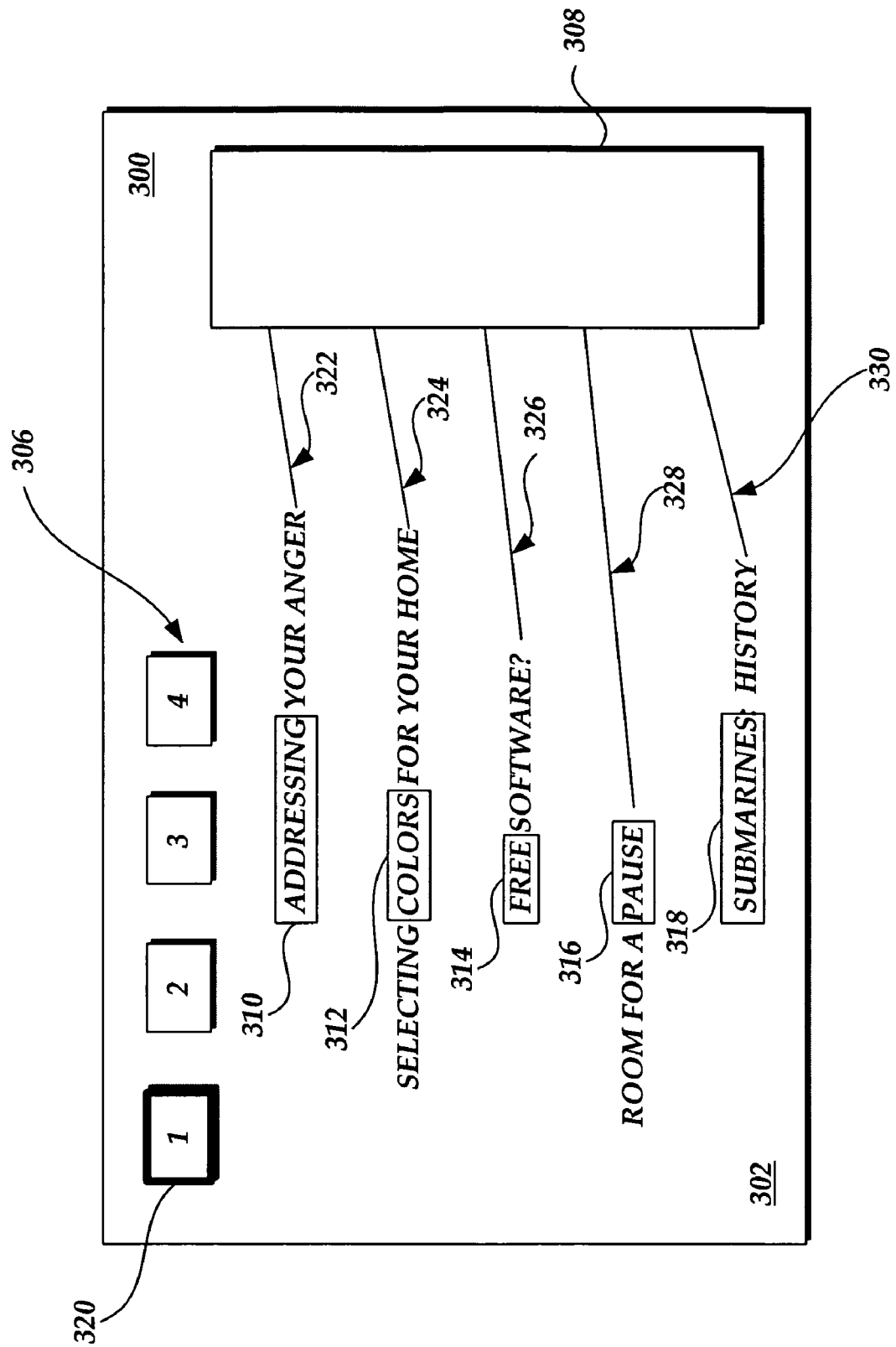
FIGS. 4A and 4B are block diagrams of the screen display of FIG. 3 illustrating the presentation of a subset of elements from an ordered index and including indicia related to a first index display depth in accordance with an aspect of the present invention.

With reference now to FIGS. 4A-7, an illustrative example of the processing of routine 100 for a permuted index by a software application will be described. With reference to FIG. 4A, it will be assumed that the initial iteration of block 102 generated a distribution interval of the displayed elements corresponding to 2^5. As illustrated in FIG. 4A, the relevant terms 310, 312, 314, 316, 318 are displayed on the first portion 302 of the screen display 300. In an illustrative embodiment, the relevant terms 310, 312, 314, 316, 318 graphically aligned to provide additional context as to the distribution of the relevant terms in the index. Additionally, because this was the first selection of a subset of elements, the second portion 306 has highlighted the first indicia of index depth 320, which identifies the index depth as "1." Finally, the third portion 308 includes a representation of a portion of the index with pointers 322, 324, 326, 328, 330 to the location of the identified elements within the representation of the index. With reference now to FIG. 4B, for illustrative purposes, it will be assumed that a user has selected relevant term 316 for greater detail. Accordingly, the relevant term 316 is highlighted 332 on the first portion of the display screen 300.

Figure 5:
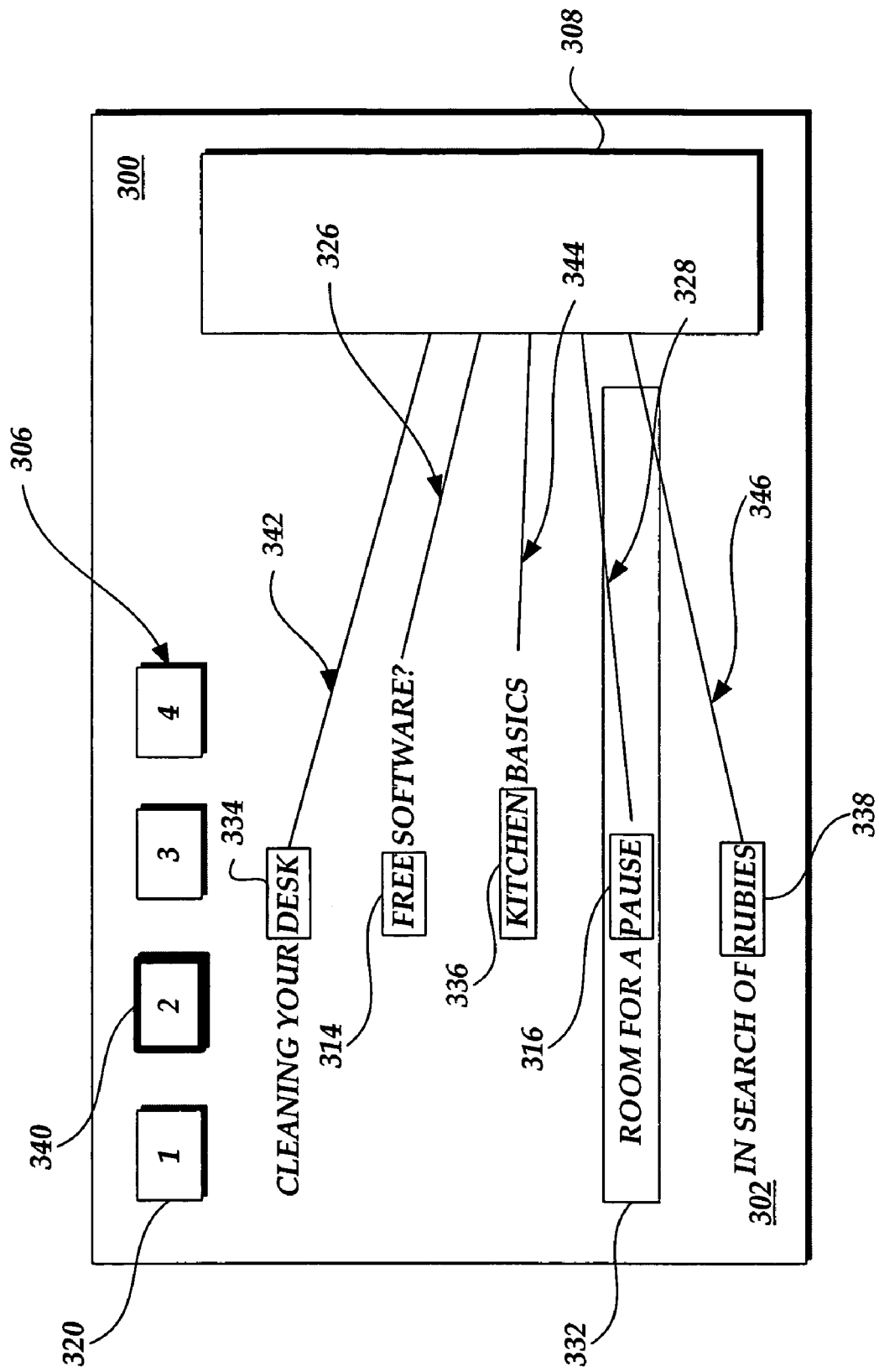
FIG. 5 is a block diagram of the screen display of FIG. 3 illustrating the presentation of a subset of elements from an ordered index and including indicia related to a second index display depth in accordance with an aspect of the present invention.

With reference now to FIG. 5, if the desired keyword element was not displayed, the software application receives additional input from the user for more detail related to the selected element 316. Accordingly, the software application has selected a second subset of elements with a smaller distribution interval. Additionally, the software application has displayed the portion of the subset of elements most close to the selected element 316. As illustrated FIG. 5, the relevant terms 334, 336, 316, and 338 are displayed in the first portion 302 and highlighted. Similar to FIG. 4A, the relevant terms are aligned to assist with context. In this iteration, the selected element 316 remains in its previous location on the display screen. Additionally, relevant term 314 remains in the display because the distribution has been increased by a power of two. Accordingly, only the location of relevant element 314 from the selected element 316 has changed. Additionally, because this is the second selection of a subset of elements from the index, the second indicia of index display depth 340 is highlighted in the second portion 306. Finally, the third portion 308 includes pointers 342, 326, 344, 328, and 346 to the location of the identified elements on the representation 308 of the portion of the index.

Figure 4B:
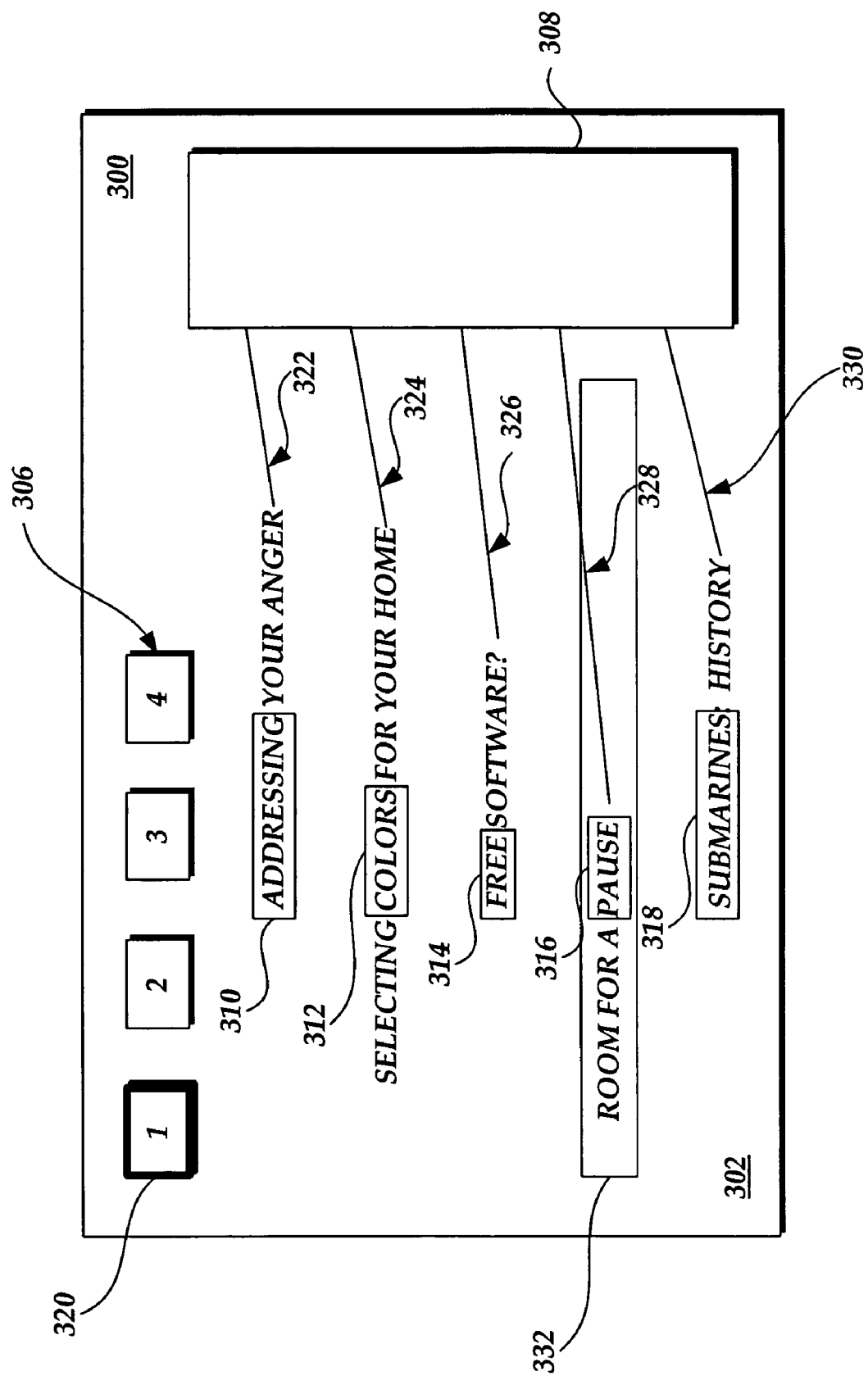

In an illustrative embodiment, the transition between the results illustrated in FIG. 4B and the results illustrated in FIG. 5 may be facilitated through the utilization of formatting and/or animation. In one embodiment, the software application may utilization animation to signify the removal of the first five elements 310-318 and the appearance of the next five elements 314 and 332-338. Because the distribution interval can be represented as a power of 2, the elements can be animated to illustrate the decrease/increase of the interval by a factor of 2. In a further embodiment, the software application may utilize different font styles, sizes and/or colors to distinguish results from the first and second iterations.

Figure 6:
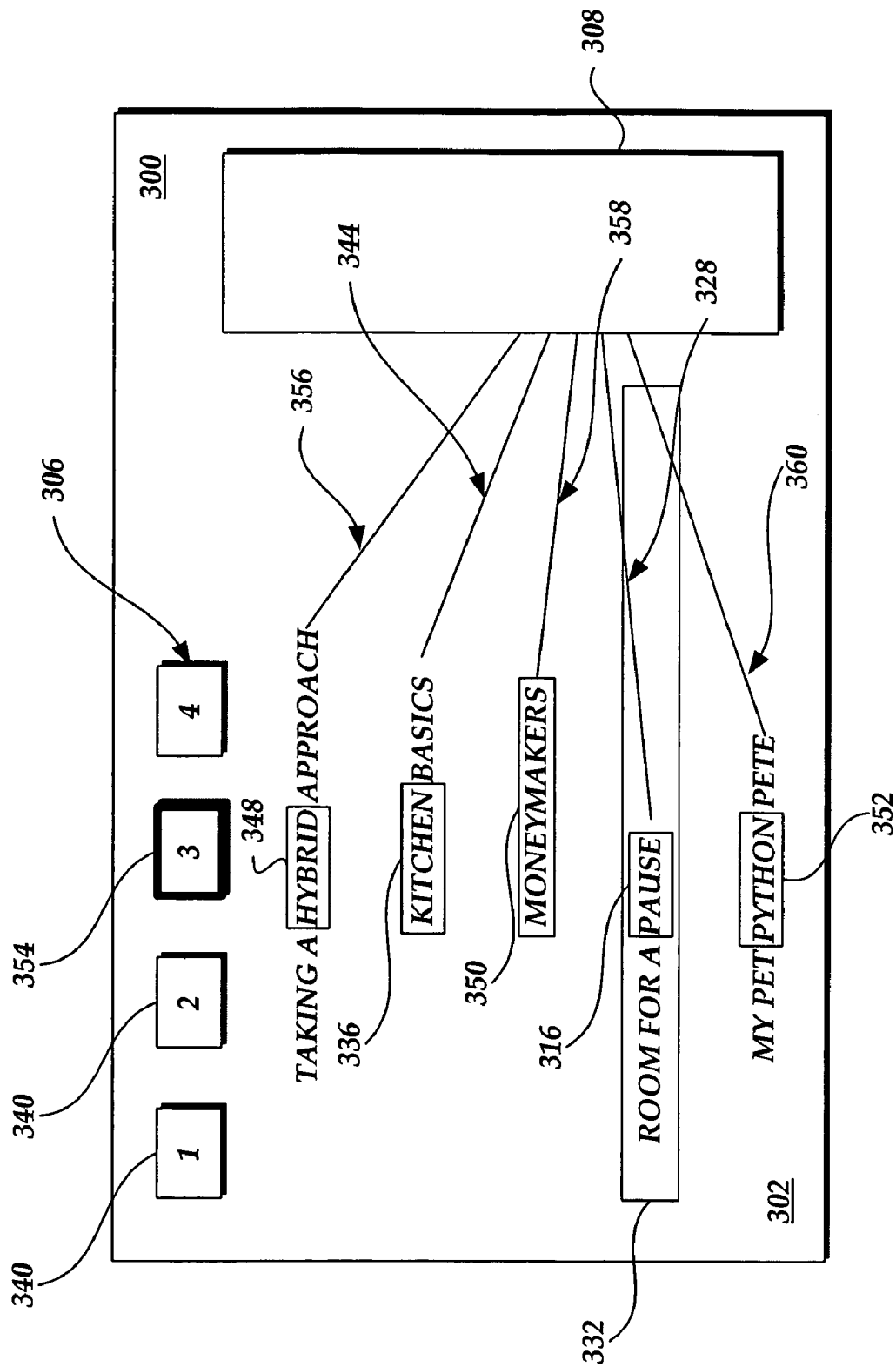
FIG. 6 is a block diagram of the screen display of FIG. 3 illustrating the presentation of a subset of elements from an ordered index and including indicia related to a third index display depth in accordance with an aspect of the present invention.

Referring now to FIG. 6, if the desired keyword element was still not displayed, the software application receives additional input from the user for more detail related to the selected element 316. Accordingly, the software application has selected a third subset of elements with a yet smaller distribution interval. Additionally, the software application has displayed the portion of the subset of elements most close to the selected element 332. Similar to FIGS. 4A, 4B and 5, the relevant terms 348, 336, 350, 316, and 352 are displayed in the first portion 302 and highlighted. In this iteration, the selected element 316 remains in its previous location on the display screen 300. Additionally, relevant term 314 has been removed from the first portion 302 of the display screen and relevant term 336 remains in the screen display 300. Because this is the third selection of subset of elements, the third indicia of index display depth 354 is highlighted in the second portion 306. Finally, the third portion 308 includes pointers 356, 344, 358, 328, 360 to the location of the identified elements on the representation 308 of a portion of the index.

Figure 7:
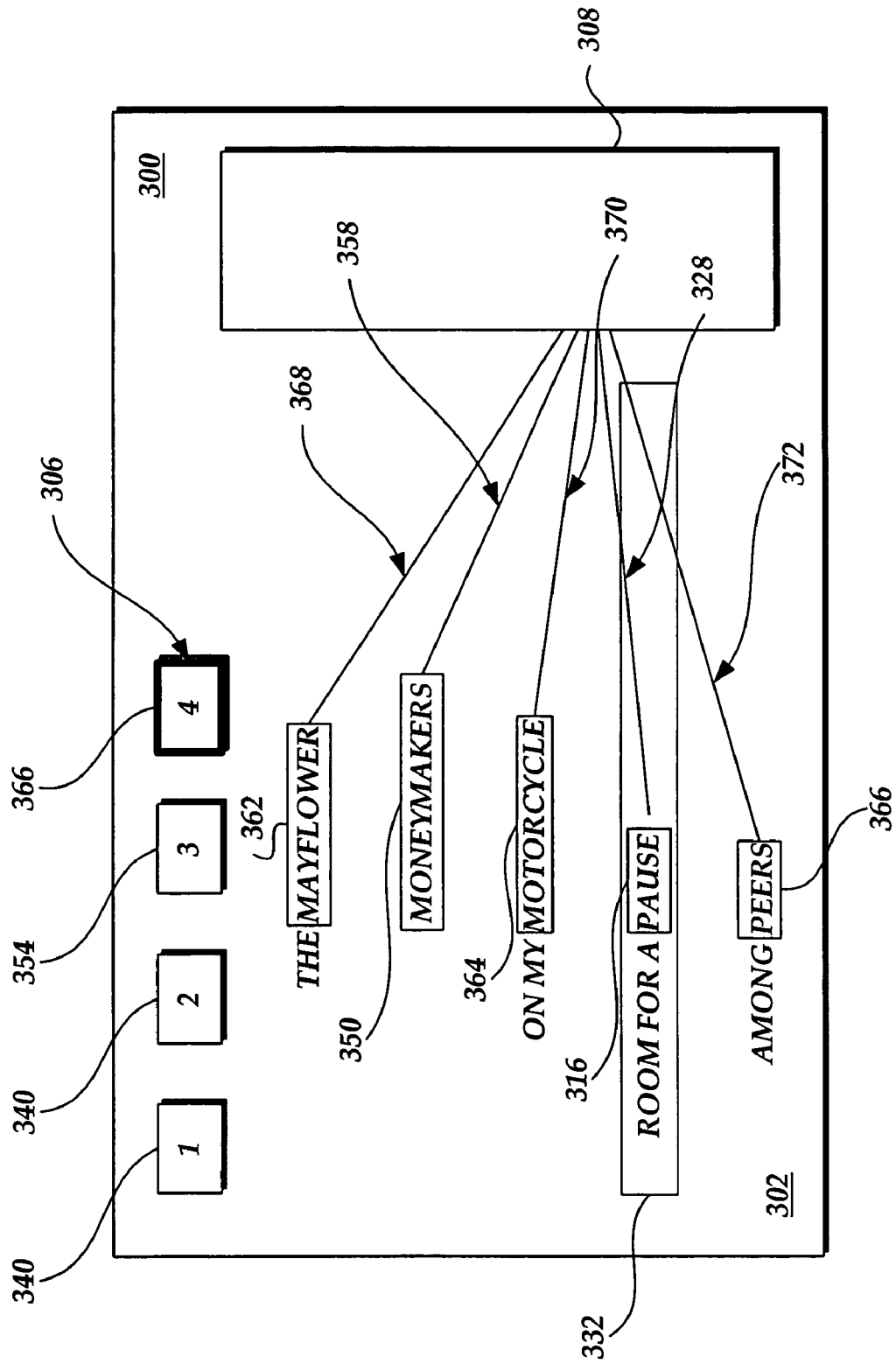
FIG. 7 is a block diagram of the screen display of FIG. 3 illustrating the presentation of a subset of elements from an ordered index and including indicia related to a fourth index display depth in accordance with an aspect of the present invention.

With reference now to FIG. 7, if the desired keyword element was still not displayed, the software application receives additional input from the user for more detail related to the selected element 316. Accordingly, the software application has selected a fourth subset of elements with the smallest distribution interval. Additionally, the software application has displayed the portion of the subset of elements most close to the selected element 332. In this scenario, the software application can now list all the elements adjacent to the selected element 316. Similar to FIGS. 4-6, the remaining relevant terms 362, 350, 364, 316, 366 are displayed in the first portion 302 and highlighted. In this iteration, the selected element 316 remains in its previous location on the display screen. Additionally, relevant term 350 remains in the screen display 300. Because this is the fourth selection of a subset of display elements, the fourth indicia of index display depth 368 is highlighted in the second portion 306. Finally, the third portion 308 includes pointers 368, 358, 370, 328, and 372 to the location of the identified elements on the representation 308 of the portion of the index.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A method for managing an index of ordered elements, the method comprising:
   employing a processor to execute computer readable instructions stored on a computer readable medium to perform the following acts:
   obtaining an index having a number of ordered elements;
   selecting a first subset of two or more ordered elements through selection of an equal distribution of the ordered elements of the index corresponding to a first index display depth, the first subset of selected elements are separated by a first selection interval corresponding to the first index display depth;
   displaying the first subset of the two or more ordered elements on a display screen;
   display indicia indicative of at least one index depth property of the first subset of the two or more elements corresponding to actionable display objects that facilitate movement through various index display depths, the indicia including a reference to a visual indicator of the first index display depth and a reference to a location of the first subset of two or more ordered elements within the index;
   obtaining a request to display a second subset of ordered elements corresponding to a second index display depth, the first index depth and second index depth not being equal;
   selecting a second subset of two or more ordered elements corresponding to the second index display depth, the second subset of selected elements are separated by a second selection interval different from the first selection interval and correspond to the second index display depth, the first subset and second subset are different at least in part,
     wherein the selecting enables a user to see either a closer distribution of elements related to the selected second subset of two or more ordered elements or a larger distribution of elements related to the selected second subset of two or more ordered elements;
   displaying the second subset of two or more ordered elements on the display screen;
   identifying a relevant index element of the first subset or second subset;
   displaying a representation of at least a portion of the index of ordered elements on the display screen, the representation being dynamically adjustable and the representation including an illustration of an overall length of the index as a thumbnail image, wherein the displaying includes:
     conducting a test to determine whether all identified elements can be displayed on the display screen;
     limiting a number of index elements that are displayed on the display screen based upon user preferences and available screen size; and
     selecting a portion of the first subset and the second subset to be displayed on the display screen when a number of the identified elements in the index satisfying a search criteria exceeds a display threshold;
   displaying a location of each displayed ordered element in the representation of at least a portion of the index of ordered elements; and
   highlighting the identified relevant index element upon the display.

2. The method of claim 1, the first selection interval and the second selection interval being based on powers of two.

3. The method of claim 1, wherein the request to display a second subset of two or more ordered elements corresponds to a manipulation input command.

4. The method of claim 1, further comprising displaying a series of indicia indicative of index display depths, displaying indicia indicative of at least one index depth property includes highlighting indicia corresponding to an index display depth of a displayed subset of two or more ordered elements.

5. The method of claim 4, further comprising obtaining a request to display a second subset of two or more ordered elements corresponding to a manipulation of an index display depth indicia.

6. A computer-readable storage medium containing computer-executable instructions that, when executed, cause a computer system to perform a method for managing an index of ordered elements, the method comprising:
   obtaining an index having a plurality of ordered elements;

determining if the plurality of ordered elements can be displayed on a display screen, the determining including:
  limiting a number of the plurality of ordered elements that are displayed on the display screen based upon user preferences and available screen size; and
  selecting a portion of the plurality of ordered elements to be displayed on the display screen when a number of the plurality of ordered elements in the index satisfying a search criteria exceeds a display threshold;
displaying the plurality of ordered elements if it is determined that the ordered elements can be displayed;
performing the following if it is determined the ordered elements cannot be displayed:
selecting a first set of ordered elements corresponding to a first selection interval if the determination produces a negative result;
displaying the first set of ordered elements corresponding to the first selection interval;
displaying indicia indicative of at least one index display depth property corresponding to the first selection interval and to actionable display objects that facilitate movement through various index display depths, the at least one index depth being a number of sequential selection of subsets of display elements, and the indicia including a reference to a visual indicator of the at least one index display depth and a reference to a location of the first selection interval;
selecting a second set of ordered elements corresponding to a second selection interval different from the first selection interval, the first set of ordered elements and the second set of ordered elements are not equal to one another,
  wherein the selecting enables a user to see either a closer distribution of elements related to the selected second set of ordered elements or a larger distribution of elements related to the selected second set of ordered elements;
displaying the second set of elements corresponding to the second selection interval;
in the second set of ordered elements, further displaying a changed location of a member of the first set of ordered elements in a representation of at least a portion of the index of ordered elements on the display screen, the representation including an illustration of overall length of the index as a graphic or a thumbnail image; and
displaying indicia indicative of at least one index display depth property corresponding to the second selection interval.

7. The method of claim 6, wherein the first selection interval and the second selection interval correspond to powers of two and the first selection interval and second selection interval equally distribute respective ordered elements.

8. The method of claim 7, wherein the second selection interval is a factor of two different from the first selection interval.

9. The method of claim 6, further comprising displaying a series of indicia corresponding to an index display depth, displaying indicia indicative of at least one index depth property includes highlighting an indicia corresponding to the index display depth of the displayed set of ordered elements from the series of indicia.

10. The method of claim 6, wherein the displaying indicia indicative of at least one index depth property includes:
  displaying a representation of at least a portion of the index of ordered elements; and
  displaying a location of each of the displayed ordered elements on the representation of at least a portion of the ordered index of ordered elements.

11. A computer-readable storage medium having computer executable components stored thereon for managing an index of ordered elements, the computer-executable components comprising:
an index element selection component for:
  displaying on a display screen a first subset of ordered elements from an index of ordered elements, the first subset of ordered elements are separated by a first selection interval corresponding to a first index display depth based upon a user preference and a available display size;
  displaying indicia indicative of at least one index depth property of the first subset of ordered elements corresponding to actionable display objects that facilitate movement through various index display depths, the indicia including a reference to a visual indicator of the first index display depth and a reference to a location of the first subset of ordered elements within the index;
  obtaining a request to display a second subset of ordered elements from the index of ordered elements, the first set of ordered elements and the second set of ordered elements not being equal to one another,
    wherein the obtaining a request to display a second subset of ordered elements enables a user to see either a closer distribution of elements related to the second subset of ordered elements or a larger distribution of elements related to the second subset of ordered elements;
  displaying on a display screen the second subset of ordered elements while removing display of the first subset, wherein the second subset of ordered elements are separated by a second selection interval corresponding to a second index display depth based upon a user preference and an available display size, and further, in the second subset of ordered elements, displaying a changed location of a member of the first set of ordered elements in a representation of at least a portion of the index of ordered elements on the display screen, wherein the displaying further includes:
    conducting a test to determine whether the first subset and the second subset of ordered elements can be displayed on the display screen;
    limiting a number of ordered elements that are displayed on the display screen based upon the user preference and the available display size; and
    selection a portion of the first subset and the second subset of ordered elements to be displayed on the display screen when a number of ordered elements in the index of ordered elements satisfying a search criteria exceeds a display threshold; and
an index display property selection component for displaying on the display screen at least one index depth property associated with the first subset and second subset of elements from the index of ordered elements.

12. The computer-readable storage medium of claim 11, wherein the index is a permuted index.

13. The computer-readable storage medium of claim 11, wherein the index display property selection component displays a series of indicia corresponding to an index display depth and wherein the index display property selection component displays at least one index depth property associated with the displayed subset of elements from the index of ordered elements by highlighting one of the series of indicia.

14. The method of claim 1, wherein the second subset of selected elements is selected in part based on a focus element selected by the user from the first subset of selected elements.

15. The system of claim 6, wherein the second subset of ordered elements is selected in part based on a focus element selected by the user from the first subset of selected elements.

16. The computer-readable storage medium of claim 11, wherein the first subset of ordered elements and second subset of ordered elements are selected from the ordered index based in part on search criteria.

17. The method of claim 1, further comprising:
    determining if there is a user interaction, the user interaction including selecting an ordered element; and
    displaying additional information corresponding to the selected element.

18. The computer-readable storage medium of claim 6, the method further comprising:
    converting an ordered index into a non-ordered index or converting a permuted index into a non-permuted index, once converted the index is obtained.

19. The computer-readable storage medium of claim 6, the method further comprising:
    generating an ordered index based upon a reference target of information, the generated ordered index being obtained.

20. The method of claim 1, further comprising:
    implementing the index as one of a straight index or a permuted index; and
    converting the straight index or the permuted index to another type of index.

* * * * *